Patented Jan. 7, 1936

2,026,676

UNITED STATES PATENT OFFICE 2,026,676

TREATMENT OF SOY BEANS

Lowell O. Gill, Decatur, Ill., assignor to A. E. Staley Manufacturing Company, Decatur, Ill., a corporation of Delaware No Drawing. Application October 22, 1932, Serial No. 639,044

6 Claims. (Cl. 99—11)

This invention relates to the treatment of soy beans, and has more particular reference to the treatment of soy beans for the removal of disagreeable flavors and unpleasant odors which they normally contain and which prevent their use for human consumption. Soy beans contain material of high food value for human beings and heretofore the unpleasant odors and disagreeable taste, which are quite persistent and which have not been satisfactorily removed by prior processes, have generally rendered soy beans unsuited for human consumption.

This invention has for its object a process which will remove the unpleasant odors and disagreeable taste permanently and without detracting from the food value of the beans. I have discovered that the undesirable odors and flavors contained in soy beans may together be removed by first increasing the moisture content of the bean and thereafter quickly subjecting the bean to a high temperature for a short period of time, i. e., to a temperature which with lesser moisture content would result not only in discoloration of the dry material but in a product which lacked the desired flavor.

In accordance with my improved process, the beans are first soaked in water to bring their moisture content up to and preferably above 20% of the content of the dry material. With this moisture content the beans are subjected to a temperature of approximately 325° F., for a short period of time. This temperature is then reduced and the drying continued. The higher the temperature to which the beans are subjected the more quickly the disagreeable flavors and odors disappear. Where the temperature is approximately 325° F. the disagreeable odors and flavors have been been found to have disappeared while the beans are still quite wet, so that the temperature of the beans remains comparatively less. The remaining water may be removed by any usual or preferred drying apparatus and method.

The soaking of the beans to impart the desired moisture content may, conveniently, be for a period of 15 minutes or so in water at a temperature of approximately 100° F. This water may be drawn off at the termination of the soaking and re-used in treating subsequent beans and in this manner loss of soluble content may be kept low. The soaking of the beans and their subjection to the high temperature may be accomplished either with the beans whole or broken into pieces or pulverized, as may be desired, and after drying fine grinding and bolting may be accomplished to provide meal of required fineness.

It is thought that the invention and many of its attendant advantages will be understood from the foregoing description, and it will be apparent that various changes may be made in the steps and their order of accomplishment of the process described without departing from the spirit and scope of the invention or sacrificing all of its material advantages, the process hereinbefore described being merely a preferred embodiment thereof.

I claim:

1. The process of removing objectionable flavor from soy beans in whole or in broken pieces, which comprises imparting to them an increased moisture content without extracting the solubles therefrom, then initially subjecting the beams to a temperature substantially higher than the boiling point of water and sufficiently high to remove the natural flavor but without scorching the beans, the time of said last named treatment being sufficiently long to remove substantially all of said flavor and reducing the temperature for final drying before said increased moisture content is eliminated.

2. The process of removing undesirable flavors and odors from soy beans in whole or in broken pieces, which comprises bringing the moisture content of the beans to the order of 20% of the dry material, and then subjecting the beans to an initial drying temperature substantially higher than the boiling point of water and higher than is necessary for merely drying the beans for the period of time necessary to remove the objectionable odor and flavor, reducing the temperature of the beans sufficiently to prevent scorching of the same prior to elimination of said moisture content, and completing the drying at a lower temperature.

3. The process of preparing soy beans for consumption, which comprises imparting to the beans a moisture content of the order of 20%, subjecting the beans to a temperature of the order of 325° F. for a time sufficient to remove undesirable odor and flavor-imparting constituents therefrom, reducing the temperature of the beans before a substantial color change occurs therein and before a sufficient quantity of imparted moisture content to cause a deleterious action on said beans at said temperature is removed therefrom, and drying the beans at a relatively low temperature.

4. The process of preparing soy beans for consumption, which comprises imparting to the soy beans an increased moisture content without extracting the solubles therefrom, subjecting the moist and unextracted soy beans to a temperature sufficiently high to eliminate undesirable taste and odor imparting constituents of the soy beans, said temperature being substantially higher than the boiling point of water and above that at which soy beans normally change their color and taste when in an unmoistened condition, the time of said last named treatment being sufficiently long to remove substantially undesirable quantities of said taste and odor-imparting constituents reducing the temperature before the excess moisture is driven from said beans, and drying the beans at a temperature below that at which the beans undergo a substantial change in color and taste.

5. In the process of producing soy bean flour from soy beans containing a natural unpleasant taste and odor, the steps which comprise subjecting unextracted beans having an imparted moisture content of the order of 20 per cent to a temperature substantially higher than the boiling point of water and sufficiently high to eliminate the undesirable taste and odor from the beans, said temperature being sufficiently high to deleteriously affect the beans at a lower moisture content, reducing the temperature to which the beans are subjected after a sufficient period of time for removal of undesirable taste and odor and before a sufficient quantity of moisture is driven therefrom to injure the beans, and drying the beans at a relatively low temperature.

6. The process of treating soy beans for the removal of undesirable constituents such as odor and flavor-imparting substances, which comprises imparting an increased moisture content to the beans without loss of substantial quantitie of solubles therefrom, subjecting the beans to a temperature substantially higher than the boiling point of water and sufficiently high to deleteriously affect said beans at a lower moisture content, for a time sufficient to remove the undesirable constituents therefrom, and reducing the temperature to which said beans are subjected after removal of said constituents.

LOWELL O. GILL.